(12) United States Patent
Leach

(10) Patent No.: US 11,336,636 B2
(45) Date of Patent: May 17, 2022

(54) LOAD BALANCING ACROSS CERTIFICATES AND CERTIFICATE AUTHORITIES

(71) Applicant: Fastly Inc., San Francisco, CA (US)

(72) Inventor: Sean Leach, Castle Pines, CO (US)

(73) Assignee: Fastly, Inc., San Francisco, CA (US)

( * ) Notice: Subject to any disclaimer, the term of this patent is extended or adjusted under 35 U.S.C. 154(b) by 57 days.

(21) Appl. No.: 16/778,328

(22) Filed: Jan. 31, 2020

(65) Prior Publication Data

US 2021/0243178 A1 Aug. 5, 2021

(51) Int. Cl.
| | |
|---|---|
| *H04L 29/06* | (2006.01) |
| *H04L 9/32* | (2006.01) |
| *H04L 43/10* | (2022.01) |
| *H04L 67/141* | (2022.01) |
| *H04L 67/02* | (2022.01) |

(52) U.S. Cl.
CPC ........ *H04L 63/0823* (2013.01); *H04L 9/3268* (2013.01); *H04L 43/10* (2013.01); *H04L 67/02* (2013.01); *H04L 67/141* (2013.01)

(58) Field of Classification Search
CPC ... H04L 63/0823; H04L 9/3268; H04L 43/10; H04L 67/02; H04L 67/141
See application file for complete search history.

(56) References Cited

U.S. PATENT DOCUMENTS

| | | | | |
|---|---|---|---|---|
| 10,454,690 B1* | 10/2019 | Popoveniuc | ............... | H04L 9/30 |
| 10,771,261 B1* | 9/2020 | Lazar | .................... | H04L 9/3247 |
| 2005/0154879 A1* | 7/2005 | Engberg | ................ | H04L 9/3247 |
| | | | | 713/157 |
| 2007/0234047 A1 | 10/2007 | Miyazawa | | |
| 2011/0004763 A1 | 1/2011 | Sato | | |
| 2011/0154024 A1* | 6/2011 | Ignaci | ................... | H04L 63/102 |
| | | | | 713/156 |
| 2013/0061281 A1 | 3/2013 | Pao et al. | | |
| 2017/0005805 A1 | 1/2017 | Wang et al. | | |
| 2017/0317837 A1* | 11/2017 | Alrawais | ................... | H04L 9/14 |
| 2018/0062855 A1* | 3/2018 | Bracken | .................... | H04L 9/30 |
| 2019/0245700 A1* | 8/2019 | Dobre | ..................... | H04L 9/321 |

OTHER PUBLICATIONS

U.S. Appl. No. 15/251,129, filed Aug. 30, 2016.

* cited by examiner

*Primary Examiner* — Cheikh T Ndiaye

(57) ABSTRACT

Systems and methods for server authentication in a content delivery network are provided. Various embodiments include a content delivery network obtaining multiple digital certificates from multiple certificate authorities. When a client attempts to access the content delivery network, the network serves the client a digital certificate and then monitors the authentication of the certificate. If the authentication fails, the content delivery network serves the client another digital certificate that was issued from a different certificate authority. In other embodiments, the content delivery network constantly monitors the function of each certificate authority. The content delivery network constantly pings each certificate authority. If any one of the certificate authorities fails to respond to the pings, the content delivery network will presume the certificate authority is non-operational and will stop using certificates from the non-operational certificate authorities until they resume operation.

9 Claims, 7 Drawing Sheets

LOAD BALANCING ACROSS CERTIFICATES AND CERTIFICATE AUTHORITIES

TECHNICAL FIELD

Various embodiments disclosed herein generally relate to server authentication. More specifically, the embodiments of the present invention relate load balancing digital authentication certificates in an infrastructure service.

BACKGROUND

Content delivery networks, edge cloud platforms, and other types of infrastructure services send and receive huge volumes of data. Such infrastructure services provide a variety of functions to their customers such as content caching, load balancing, and security. Caching allows content to be stored closer to end users relative to the customer origin servers from which it is obtained. Load balancing distributes incoming traffic across a customer's servers to avoid burdening any one server or point-of-presence (PoP) with an inordinate amount of traffic.

To ensure security within an infrastructure service, a trusted third party such as a certificate authority is used to verify the revocation status of public keys held by servers within the infrastructure service. A certificate authority will issue certificates to an infrastructure service and the network proceeds to distribute the digital certificates throughout the edge network of the infrastructure service. When a client application attempts to access cached content stored in a infrastructure service or attempts to connect to an origin server through the infrastructure service, the network first presents the user device with a digital authentication certificate alongside a time-stamped online certificate status protocol (OCSP) response (e.g. OCSP stapling) that is used to prove ownership of a public key, determine the revocation status of the digital certificate, and prove the identity of the owner of the certificate.

To facilitate the establishment of secure connections with client applications, an infrastructure service (or elements within the infrastructure service) will routinely send OCSP requests to a certificate authority. The OCSP request prompts the certificate authority to check whether or not the digital certificate held by the infrastructure service has been revoked. If the digital certificate has not been revoked, the certificate authority returns a time stamped and signed OCSP response to the infrastructure service. When a client application attempts to connect to the infrastructure service, the infrastructure service will present a digital certificate and the time stamped and signed OCSP response to complete the transport layer security (TLS) handshake. When the client application receives certificate and the OCSP response, the client application validates the authenticity of the certificate and a secure connection is established. Therefore, the infrastructure service must routinely send OCSP requests the certificate authority to update the time stamp and revocation status of the infrastructure service's certificate. However, if the certificate authority is unable to receive OCSP requests from the infrastructure service, the infrastructure service cannot update the revocation status and time stamp of the certificate and secure connections with client applications may not be able to be established. For instance, if a certificate authority goes offline, an infrastructure service will not be able to send. OCSP requests to the certificate authority and in turn, will not be able to obtain up to date OCSP responses.

The authentication process of digital certificates is often completed outside of the infrastructure service. As such, if the connection between the infrastructure service and the certificate authority is faulty, or if the certificate authority is non-operative, then the certificate cannot be validated. Other issues arise when a certificate authority is removed from a browser trust store of a client application which can prevent the client application from determining the revocation status of a digital certificate. If the revocation status of the certificate cannot be validated by the certificate authority, a secure connection between the user device and the infrastructure service cannot be established. Without the establishment of a secure connection, the client application is unable to access content stored within the network or connect to an origin server through the infrastructure provided by the infrastructure service.

As such, there are a number of challenges and inefficiencies created in traditional server authentication. For example, infrastructure services are unable to protect against a certificate authority going offline thereby preventing users from accessing the infrastructure service. Thus, it can be difficult to establish reliable and secure connections between users and the edge nodes of an infrastructure service. It is with respect to these and other problems that embodiments of the present invention have been made.

OVERVIEW

Systems and methods are disclosed herein for obtaining and distributing digital authentication certificates to an infrastructure service such that servers within the edge network of the infrastructure service may be more readily authenticated. In one implementation, an infrastructure service includes an edge network which further includes one or more edge nodes. The edge network receives a content request, sent by a client application, to establish a secure connection with an origin customer. The edge network, or an element within the edge network such as an edge node, point of presence, or a server within, serves the client application a digital certificate and then monitors to determine if the digital certificate is validated by the client application.

The edge network, after serving a client application a digital certificate, sets a timer or counter to determine if the authentication of the certificate was successful. Upon timeout, the edge network may determine that the certificate authority is offline and will serve the client application a new digital certificate issued by a different certificate authority. The edge network then proceeds to monitor to determine if the new certificate is signed. Alternatively, the edge network can ping a client application after serving the client a digital certificate to determine if the client application is online or determine whether the client was able to authenticate the digital certificate it was served.

In the same or another implementation, an infrastructure service obtains digital certificates from multiple certificate authorities and then replicates and distributes the digital certificates throughout the edge network. The infrastructure service pings the certificate authorities to determine which certificate authorities are active. If any one certificate authority fails to respond to the ping sent by the infrastructure service, the infrastructure service notifies the edge network to cease using digital certificates originating from the one or more inactive certificate authorities. Additionally, the infrastructure service may load balance the distribution of digital certificates originating from active certificate authorities to points-of-presence within the edge network. The points-of-presence within the edge network may further load balance the issuing of digital certificates to client applications to avoid burdening any one of the active certificate authorities with an inordinate amount of traffic.

The infrastructure service continues to ping inactive certificate authorities to monitor when the inactive or otherwise unavailable certificate authorities become available to issue and sign digital certificates. Once the infrastructure service determines that the previously inactive certificate authorities are active, the infrastructure service notifies the points of presence within the edge network to resume the use of digital certificates from the previously inactive certificate authorities.

Embodiments of the present invention also include computer-readable storage media having sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which.

DETAILED DESCRIPTION

Figure 1:
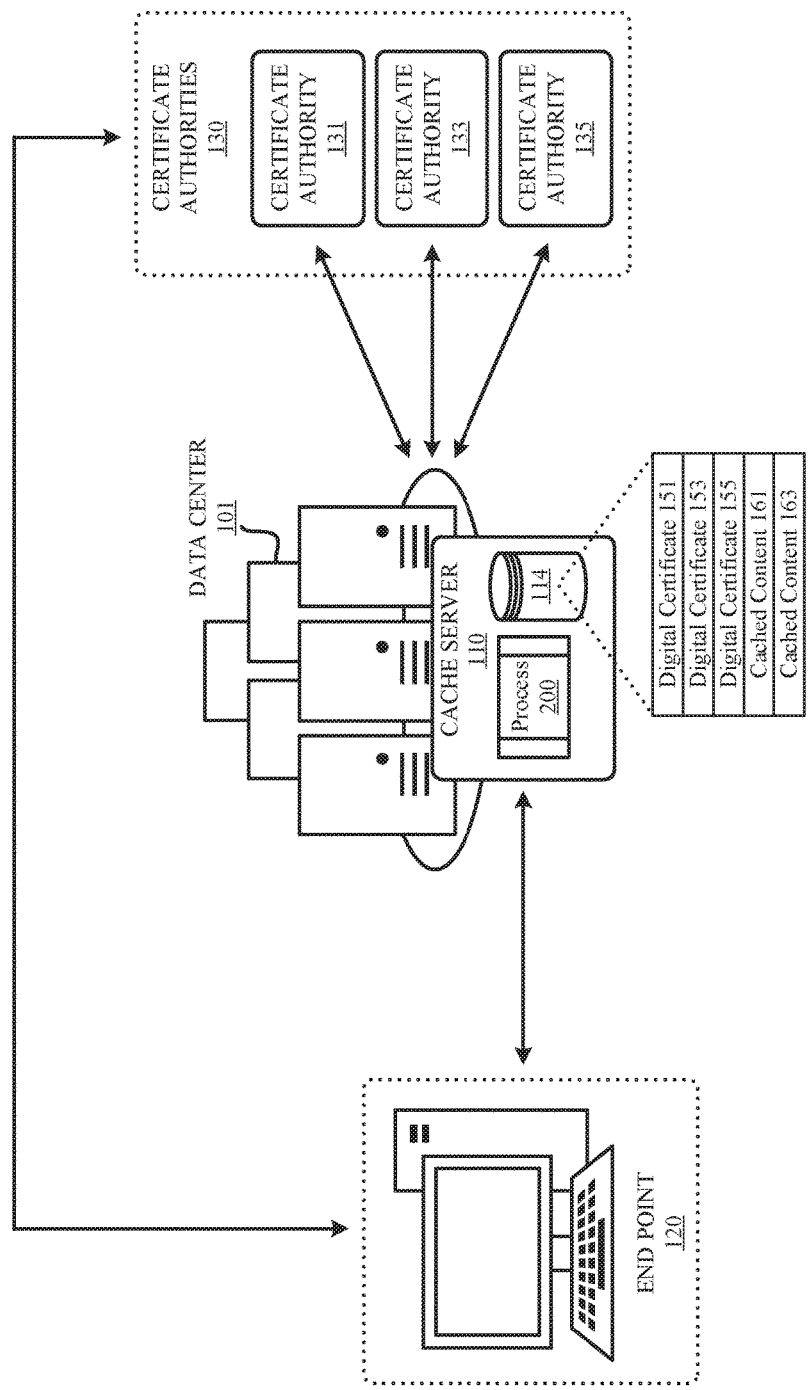
FIG. 1 illustrates an example of an operating environment in which some embodiments of the present technology may be utilized.

Technology disclosed herein improves the functioning of computing and communication networks. In particular, processes employing elements in an infrastructure service are disclosed that allow the infrastructure service to optimize server authentication in an edge network. In an implementation, a client application attempts to establish a secure connection through an infrastructure service with an origin server. In response to the request, the infrastructure service serves the client application a digital certificate to signal to the client application the identity of the infrastructure service. The infrastructure service then monitors to determine if the digital certificate is validated by the online certificate status protocol (OCSP) used by a certificate authority. The infrastructure service may utilize timers, counters, or some other method to determine if the client application was unable to verify the authenticity of the certificate.

On the client side, the client application may furnish an OCSP request to the certificate authority which originally issued the certificate to the infrastructure service. The certificate authority may utilize OCSP to authenticate or sign the certificate. Once signed, the certificate authority returns the signed certificate to the client application and the client application may then establish a secure connection with the infrastructure service. Alternatively, the infrastructure service may perform an OCSP request prior to prior to serving the client application the digital certificate. In this case, the infrastructure service will attach a signed and time stamped OCSP response to digital certificate and then serve it to the client application. The client application will then validate the digital certificate without needing to contact the certificate authority. However, if the client application is unable to connect to the certificate authority or the infrastructure service is unable obtain a signed and time stamped OCSP response from the certificate authority, the infrastructure service determines that the authentication was unsuccessful and will serve the client application a new digital certificate which was issued by a different certificate authority.

In contrast, some embodiments provide for an infrastructure service which is certified by multiple certificate authorities. The infrastructure service remains in constant communication with each certificate authority as a means to verify that the certificate authorities are operational. Alternatively, the infrastructure service may ping each of the certificate authorities to test the availability of each certificate authority. The pinging of the certificate authority may comprise an internet control message protocol (ICMP) echo request, an online certificate status protocol (OCSP) health check, or a hypertext transfer protocol (HTTP) health check, or any other type of request that determines the status of the certificate authority, to the one or more certificate authorities.

If the infrastructure service does not receive a response to the ping by any one of the certificate authorities, the infrastructure service will stop serving digital certificates to client applications that are associated with offline certificate authorities. In other embodiments, the infrastructure service may continuously ping each of the certificate authorities associated with the infrastructure service to determine the operational status, or in other words, operational state of each certificate authority. If the any one of the certificate authorities fails to respond to the pinging, the infrastructure service determines that an operational status or state is anomalous and will cease using digital certificates which originated from the non-responsive certificate authority. In still further embodiments, one or more certificate authorities may use the infrastructure service as a means to issue digital certificates. In this case, the infrastructure service may monitor the communication channels of the infrastructure service used by the certificate authorities to determine whether each certificate authority is active or inactive. For instance, if the infrastructure service determines that a certificate authority is sending traffic through the infrastructure service, the infrastructure service may determine that the certificate authority is active. On the other hand, if the infrastructure service detects that a certificate authority is no longer sending traffic through the infrastructure service, the service may determine that the operating state certificate authority is anomalous.

Once the client application has successfully verified the authenticity of the digital certificate held by the infrastructure service, the client application establishes a transport-layer connection with an origin server. The path to the origin server includes the edge network provided by the infrastructure service. Having connected to the origin server, the client application sends a request to conduct a secure session with the origin server.

In some implementations, the transport layer connection operates in accordance with a reliable transport protocol such as the transmission control protocol (TCP), although non-reliable transport protocols such as the user datagram protocol (UDP) may also be used. Examples of secure sessions include transport layer security (TLS) sessions and secure session layer (SSL) sessions. An example of the request sent by the client application is the ClientHello message that begins a TLS handshake, which includes a server name identification (SNI) field. Examples of traffic that may be sent and received within the secure session include secure hypertext transfer protocol (HTTPS) traffic, session initiation protocol (SIP) traffic, and Internet of Things (IoT) traffic. The edge network may provide a variety of functions with respect to such traffic, including caching content from customer origins, hosting applications at the edge, and shielding the origins from distributed denial of service (DDoS) attacks.

The edge network may function as a pass-through network for some types of secure traffic originating from the client application such as real-time voice and video communications, secure transactions, and the like. The edge network can provide an accelerator function with respect to such traffic by optimizing the paths taken by the traffic through the network. Traffic originating from the client application can also be accelerated by optimizing the paths taken to and from the network points-of-presence (Pas).

For instance, the infrastructure service may replace a source address of the traffic sent by the client application with a new source address to influence a return path taken by return traffic sent by the origin server to the client application. In another example, the service may replace a source address of the traffic sent by the origin to influence a return path taken by return traffic sent by the client application to the origin server. Still other examples include selecting an egress point of presence (PoP) of the network to a transit network situated between the network and the origin server and routing the traffic to the egress PoP.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to service authentication with respect to an infrastructure service.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Now referring to the figures, FIG. 1 illustrates an operational architecture 100 in an example implementation of multi-source digital certificate server authentication. Data center 101 is represented of one or more computing devices integrated into a network that communicates with user devices. Examples include, but are not limited to, server computers and data storage devices deployed on-premises, in the cloud, in a hybrid cloud, or elsewhere, by content providers such as enterprises, organizations, individuals, and the like. Data center 101 may rely on the physical connections provided by one or more other network providers such as transit network providers, Internet backbone providers, and the like to interface with end point 120 and/or certificate authorities 130. Data center 101 may further be integrated into an infrastructure service (not shown) to provide one or more functions for and/or on behalf of its customers such as edge computing, content caching, image optimization, content streaming, cloud security, load balancing, and traffic acceleration.

Certificate authorities 130 includes certificate authority 131, certificate authority 133, and certificate authority 135. However, certificate authorities 130 is not limited by the number or type of certificate authorities. Examples include, but are not limited to, certificate authorities, registration authorities, central directories, certificate management systems, or any other type of trusted third party. Data center 101 is communicatively coupled to certificate authorities 131, 133, and 135. Data center 101 periodically obtains digital certificates from each of certificate authorities 131, 133, and 135. In some implementations, data center 101 may not be in direct contact with some or all of certificate authorities 130. In this example, a separate data center or related device may obtain the digital certificates from certificate authorities 130 and once obtained, replicate and then transfer the digital certificates to data center 110. In some instances, data center 101 obtains multiple digital certificates by submitting a certificate signing request to certificate authorities 131, 133, and 135 where the certificate signing requests include a public key, identifying information, and a digital signature.

In some embodiments, the digital certificates obtained from certificate authorities 130 conform to the X.509 digital certificate standard and may be used in transport layer security (TLS) server authentication. The digital certificates can include, but are not limited to, a serial number, owner name, issuer name, and a public key. However, each digital certificate issued by certificate authorities 130 can only be verified by the certificate authority which issued the certificate. For example, certificate authority 131 can issue digital certificate 151 to data center 101 which then distributes the digital certificate 151 to the constituent computing devices of data center 101 included cache server 110. In this example, when cache server 110 serves digital certificate 151 to end point 120, certificate 131 is the only certificate authority which can verify the revocation status of digital certificate 151.

Data center 101 includes cache server 110 which is representative of a computing device, such as a server computer, that caches content and serves content to a client application, such as end pint 120, on request. Cache server HO incudes process 200 as well as storage 114. Cache server 110 stores digital certificates 151, 153, and 155 as well as content 161 and 163 on storage 114. Storage 114 may be any number of storage devices including random access memory, read only memory, magnetic disks, optical disks, optical media, flash memory, virtual memory, and non-virtual memory, magnetic cassettes, magnetic tape, magnetic disk storage or other magnetic storage devices, or any other suitable storage media. Content 161 and 163 may be any content including text, images, video, web pages, objects, applications, transactions, or any other type of content. Digital certificates 151, 153, and 155 are held by cache server 110 and verify the identity of cache server 110. In some examples, digital certificates 151, 153, and 155 may be transport layer security certificates, secure sockets layer certificates, email certificates, code signing certificates, or qualified certificates.

End point 120 is representative of computing devices capable of communicating with cache server 110. Examples include, but are not limited to, laptop and desktop computers, tablet computers, mobile phones, wearable devices, entertainment devices, gaming devices, other server computers, Internet of Things (IoT) devices, or any other type of end point device. End point 120 may attempt to establish a secure session through by means of a security protocol such as secure hypertext transfer protocol (HTTPS) with cache server 110. In order to establish a secure session, cache server 110 transmits one of the digital certificates, either digital certificate 151, 153, or 155, to end point 120. Additionally, cache server 110 may transmit a signed and time stamped OCSP response alongside either digital certificate 151, 153, 155.

For example, cache server 110 may send certificate 153 to end point 120 upon a request to establish a secure session with cache server 110 by end point 120. Upon receiving digital certificate 153, end point 120 then creates an online certificate status protocol (OCSP) request to establish the validity of digital certificate 153. The OCSP request includes the serial number of digital certificate 153 and any other information needed by the certificate authority that issued digital certificate 153 to determine the validity of digital certificate 153. End point 120 transfers the OCSP request to the certificate authority of certificate authorities 130 which originally issued digital certificate 153. For instance, if certificate authority 135 issued digital certificate 153 to cache server 110, then end point 120 would send the OCSP request to certificate authority 135. The certificate authority that receives the OCSP request from end point 120 then determines if digital certificate 153 is still valid.

If the certificate authority determines digital certificate 153 to be valid, the certificate authority responds to end point 120 with an OCSP response. The OCSP response signifies to end point 120 that digital certificate 153 is either valid or revoked. If still valid, end point 120 may complete the TLS handshake with cache server 110 and a secure session is then established.

Alternatively, cache server 110 may, prior to sending certificate 153 to end point 120, may furnish an OCSP request to the certificate authority that issued digital certificate 153. The certificate authority that issued digital certificate 153, after receiving the OCSP request, will return a signed and timed stamped OCSP response to cache server 110 if digital certificate 153 is valid. In this case, when cache server 110 serves digital certificate 153 alongside the signed and time stamped OCSP response to end point 120. End point 120 can then validate digital certificate 153 without contacting the certificate authority by examining the signed and time stamped OCSP response. If end point 120 finds the OCSP response is found to be adequate, end point 120 may complete the TLS handshake with cache server 110 and a secure session is then established.

Figure 2:
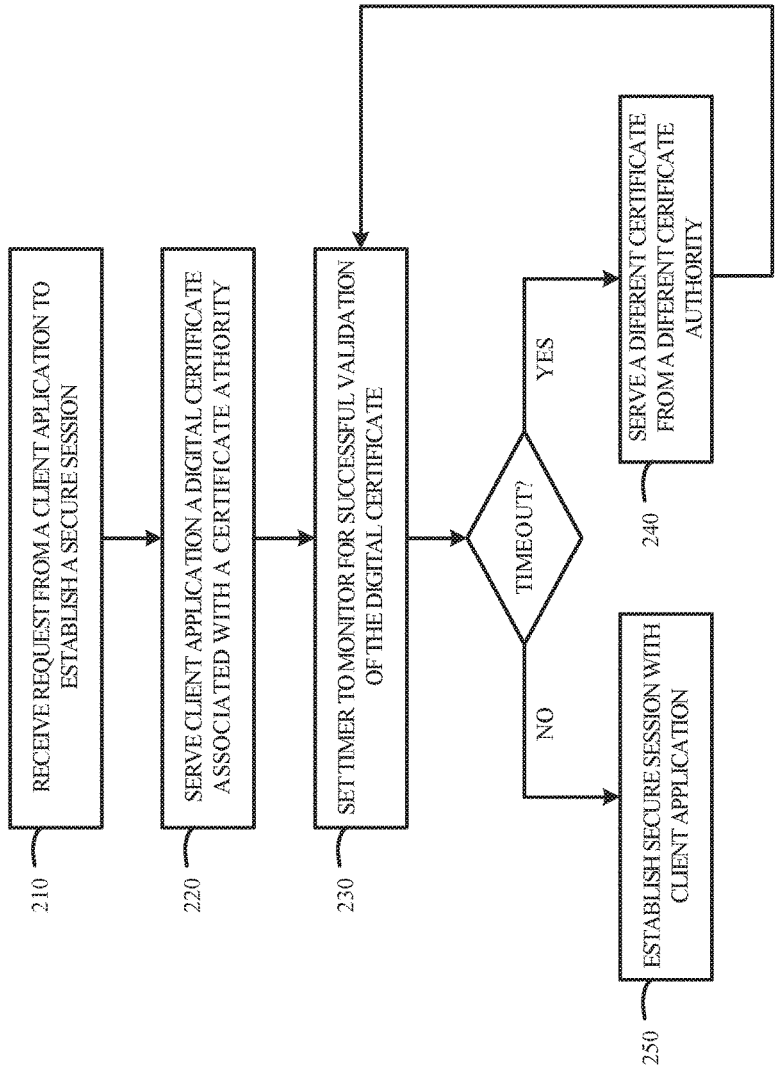
FIG. 2 is a flowchart illustrating an authentication process according to one or more embodiments of the present technology.

In an advance, cache server 110 performs authentication process 200, described in FIG. 2, in order to assure that either end point 120, or cache server 110, completes the OCSP authentication of the digital certificate. Authentication process 200 may be implemented in program instructions in the context of any of the software applications, modules, components, or other such programming elements of cache server 110. The program instructions direct the underlying physical or virtual computing system or systems to operate as follows, referring parenthetically to the steps in FIG. 2 and in the context of the operational architecture 100 of FIG. 1.

Referring to FIG. 2, a server (e.g. cache server 110) employing authentication process 200 receives a request from a client application (e.g. end point 120) to establish a secure connection (step 210). In some embodiments, the client application is attempting to access content cached stored on the server. Alternatively, if the server is unable to fulfil the request, may redirect the client application to an alternative location. Either way a secure session will be established before the server may interact with the client application. In response to the request to establish a secure session, the server sends a digital certificate that identifies the server to the client application. The digital certificate (e.g. digital certificate 151) was issued to the server by a certificate authority (e.g. certificate authority 131). The digital certificate identifies the server as the owner of the certificate or may instead identify an organization that controls the server as the owner of the certificate. The digital certificate includes a public key and as well as a serial number assigned to the digital certificate by the certificate authority which issued the certificate. In some embodiments, a signed and time stamped OCSP response may be attached, or stapled, to the digital certificate.

After the server sends the digital certificate to the client application, the server sets a timer to monitor for the successful validation of the digital certificate (step 230). The timer may pause the command processor of the server for a period of time to determine if the client application was able to successful validate the digital certificate. When the client application receives the digital certificate from the server, the client application forms an online certificate status protocol (OCSP) request to the certificate authority that issued the digital certificate to the server. Alternatively, if the digital certificate had an attached signed and time stamped OCSP response, the client application may forgo forming an OCSP request and instead examine the authenticity of the OCSP response.

Monitoring for the completion of the OCSP authorization of the certificate could involve setting a timer roughly equal to the time needed to perform an OCSP authorization of the certificate. Upon time-out, the infrastructure service would assume that a state of the connection is anomalous and that OCSP authorization of the digital certificate may have failed. Alternatively, monitoring for successful OCSP authorization could further involve the infrastructure service pinging the client application. Pinging the client application could involve determining if the end point is still active, determining if the end point was able to connect to the certificate authority, or determining if the client application was able to validate the attached OCSP response. In certain circumstances, the client application will have the certificate authority that issued the digital certificate removed in client application's trust store and therefore will be unable to validate the OCSP response. Regardless of the mode of failure, if a timeout occurs or the server receives some other indication that the OCSP authorization failed, the server determines that a state of the connection between the client application and the server is anomalous. The server then serves the client application a different digital certificate originating from a different certificate authority (step 240) and continues to monitor for successful OCSP authorization. When OCSP authorization is successful, the server proceeds to establish a secure session with the client application (step 250). It should be appreciated that this process is not limited by the number of certificate authorities from which an infrastructure service can source digital certificates from nor by the type of digital certificates used.

After a secure session between the client application and the server is established, the server may then respond to content requests sent to the server by the client application. The server may respond to a content request by sending cached content (e.g. cached content 161) to the client application. However, if the client application sends a content request, or any other request which the server cannot immediately satisfy, the server may redirect the client application to the required destination. This may involve redirecting the client to an associated server, such as a different server in data center 101, or instead may involve redirecting the client to a content provider where the content request can be fulfilled.

Figure 3:
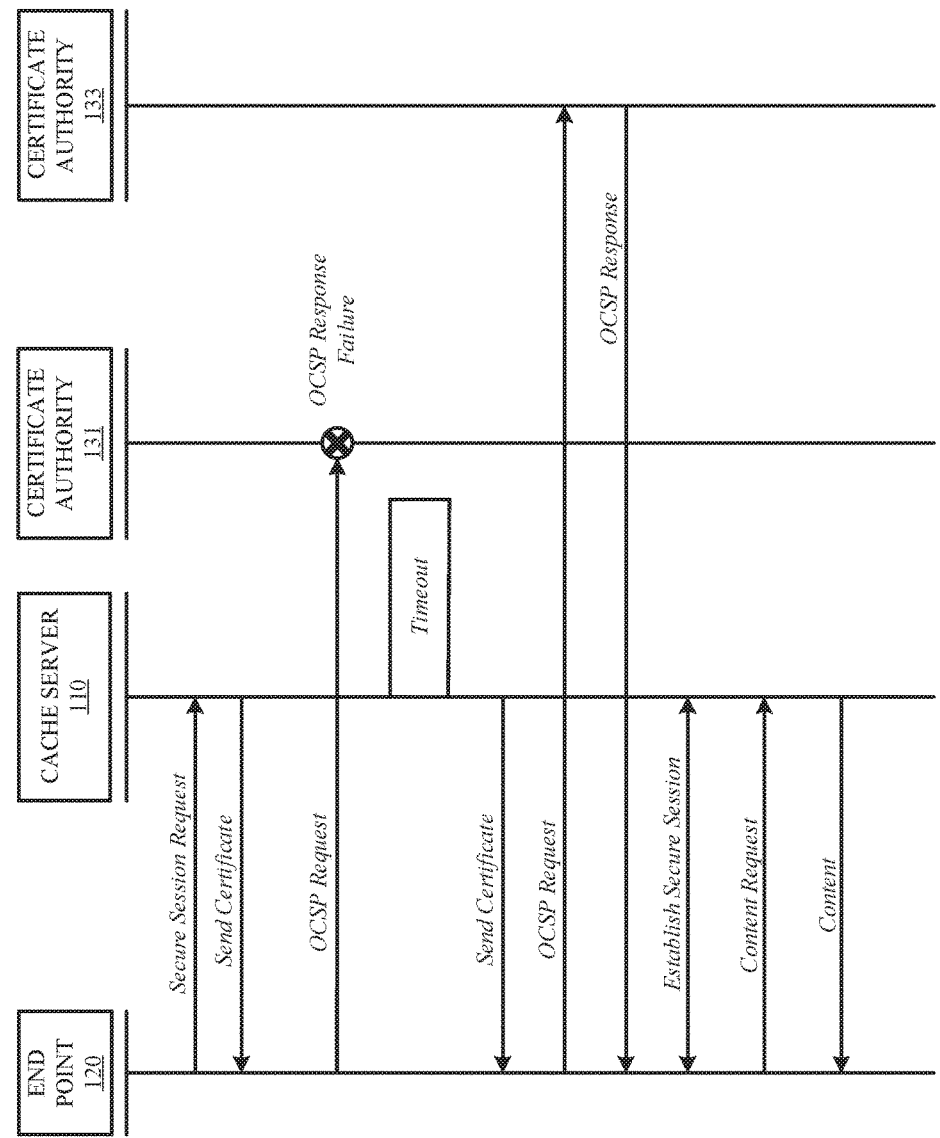
FIG. 3 illustrates an example of an operating environment according to one or more embodiments of the present technology.

Referring now to FIG. 3 which illustrates an operational sequence 300 in an example of authentication process 200 in the context of operational architecture 100. To begin, end point 120 sends a request for a secure session to cache server 110. In response to the request for a secure session, cache server 110 sends a digital certificate to end point 120. The digital certificate sent to end point 120 legitimizes the identity cache server 110 and includes a serial number which is readable by the certificate authority which issued the certificate. Once end point 120 receives the digital certificate of cache server 110, end point 120 creates an OCSP request to ascertain the revocation status of the digital certificate. The OCSP request includes at least the serial number of the digital certificate and any other identifiers needed to validate the certificate. Based on the serial number of the certificate, end point 120 ascertains that certificate authority 131 originally issued the certificate and proceeds to send the OCSP request to certificate authority 131.

After the OCSP request is sent to certificate authority, an OCSP response failure occurs. This may be due to certificate authority 131 being offline or otherwise non-functional. The OCSP failure could also arise if the network provider for certificate authority 131 is down. Either way, the certificate authority is unable to return an OCSP response to the OCSP request sent by end point 120. When this occurs, the time period set by cache server 110 to establish a secure session with end point 120 will expire and result in a timeout. The timeout indicates to cache server 110 that anomaly in the OCSP verification has occurred and prompts cache server 110 to send a new digital certificate originating from a different certificate authority to end point 120.

The second digital certificate sent will still identify cache server 110 as the legitimate holder of the certificate but will have a different serial number than the first. Thus, when end point 120 receives the second digital certificate from cache server 110, end point 120 will create a second OCSP request that includes a different serial number than the first OCSP request. After end point 120 form the second OCSP request, it determines that the new digital certificate was issued by certificate authority 133 and sends the OCSP request to certificate authority 133. Once certificate authority 133 receives the OCSP request, Certificate authority 133 determines the revocation status based on the serial number of the certificate received by end point 120. Certificate authority 133 may then form an OCSP response indicating whether the certificate held by cache server 110 is valid or if the digital certificate is revoked. If the certificate is valid, certificate authority 133 will return a signed OCSP response to end point 120 which in turn, validates the identity of cache server 110 to end point 120.

Once end point 120 receives that signed OCSP response from certificate authority 133, end point 120 and cache server 110 can then establish a secure session and the flow of secure traffic may commence. End point 120 sends a content request for content cached on cache server 120. Cache server 110 responds to the request of end point 120 with the requested content.

Figure 4:
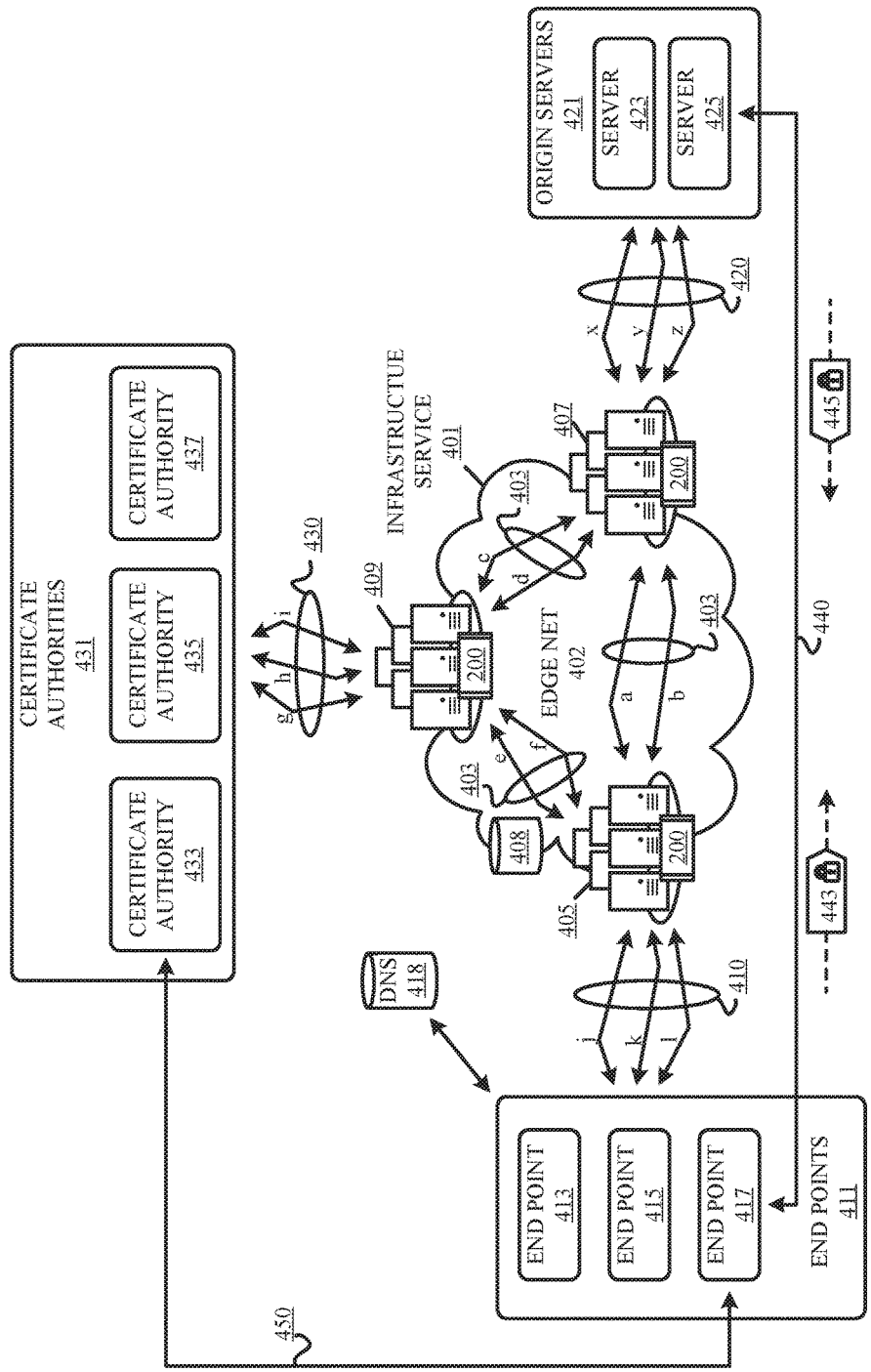
FIG. 4 is sequence diagram illustrating a set of operations according to one or more embodiments of the present technology.

Referring now to FIG. 4 which illustrates an operational architecture 400 in an example implementation of multi-source digital certificate server authentication. Operational architecture 400 includes infrastructure service 401 in communication with end points 411, origin servers 421, and certificate authorities 431. Infrastructure service 401 provides one or more functions for and/or on behalf of its customers such as edge computing, content caching, image optimization, content streaming, cloud security, load balancing, and traffic acceleration.

Infrastructure service 401 includes one or more data centers, of which data center 405, data center 407, and data center 409 are representative, connected by edge network 402. Edge network 402 is representative of one or more physical and/or virtual networks capable of connecting multiple data centers or Points of Presence. Edge network 402 may be, for example, an overlay network that relies on the physical connections provided by one or more other network providers such as transit network providers, Internet backbone providers, and the like.

Edge network 402 provides routes 403 to and from the data centers 405, 407 and 409, represented by routes a, b, c, d, e, and f. Data center 405, data center 407, and data center 409 each provide a Point of Presence (PoP) at an interface point between edge network 402 and other networks via which infrastructure service 401 may communicate with end points 411, origin servers 421, and certificate authorities 431. Examples include transit networks, local Internet service provider (ISP) networks, local area networks (LANs), wide area networks (WANs), wired and wireless networks, virtual networks, software defined networks, and any combination or variation thereof.

One or more networks that connect edge network 402 to end points 411 may be the same as one or more of the networks that provide the physical connectivity of edge network 402. Similarly, one or more networks that connect edge network 402 to origin servers 421 may be the same as one or more of the networks that provide the physical connectivity of edge network 402. Additionally, one or more networks that connect edge network 402 to certificate authorities 431 may be the same as one or more of the networks that provide the physical connectivity of edge network 402. Indeed, one or more of the networks that physically connect edge network 402 to end points 411 may be the same as the one or more of the networks that physically connect edge network 402 to origin servers 421. Data centers 405, 407, and 409 communicate with end points 411, origin servers 421, and certificate authorities 431—and with each other by way of any suitable networking protocol such as Internet Protocol version 4 (IPv4), IPv6, Internetwork Packet Exchange (IPX), Open Shortest Path First (OSPF) IPsec, and any other network protocol, variation, or combination thereof. Data centers 405, 407, and 409 may, in some implementations, be connected at the data link layer and as such may communicate via the Ethernet protocol, asynchronous transfer mode (ATM), the Point-to-Point protocol (PPP), and the like.

Infrastructure service 401 obtains digital certificates from certificate authorities 431. Certificate authorities 431 includes certificate authority 433, certificate authority 435, and certificate authority 437 and are representative of certificate provides capable of issuing and signing digital certificates. Examples include, but are not limited to, Comodo®, Symantec®, GoDaddy®, Global Sign®, Digicert®, SmartCom®, IdenTrust®, or any other digital certificate provider integrated into the public key infrastructure (PKI).

Infrastructure service 401 communicates with certificate authorities 431 over routes 430 represented by g, h, and i. Data center 409 sources digital certificates from certificate authority 433, certificate authority 435, and certificate authority 437. Data center 409 may load balance the obtaining of digital certificates such that data center 409 obtains digital certificates from certificate authorities 433, 435, and 437 in roughly proportional amounts. Alternatively, data center 409 may load balance the obtaining of digital certificates with respect to the capacity of certificate authorities 433, 435, and 437 to sign digital certificates. For example, certificate authority 433 may have a greater ability to sign digital certificates than certificate authority 435. As a consequence, infrastructure service 401 could serve more digital certificates from certificate authority 433 than certificate authority 435.

Data center 409 then distributes the digital certificates obtained from certificate authorities 431 throughout edge network 402 using routes 403 to data centers 405 and 407. Upon receiving one or more digital certificates from data center 409, data centers 405 and 407 replicate and store the digital certificates.

The digital certificates replicated and stored by data centers 405 and 107 may be public key certificates that conform to the X.509 public key standard. The digital certificates may be transport layer security (TLS) certificates, secure sockets layer certificates (SSL), email certificates, code signing certificates, qualified certificates, or any other public key certificate that validates ownership of a public key as well as the identity of the certificate owner. The digital certificates held by data centers 405, 407, and 409 may be integrated into the public key infrastructure. Data centers 405, 407, and 409 store certificates issued by certificate authority 433, certificate authority 435, and certificate authority 437 such that data centers 405, 407, and 409 are multiple certificate holders.

Traffic sent or received between end points 411 and edge network 402 may take one of multiple routes 410 to data center 405, represented by routes j, k, and l. Traffic sent or received between origin servers 421 and edge network 402 may take one of multiple routes 120 to data center 407, represented by routes x, y, and z. Data center 405 provides a point-of-presence where edge network 402 interfaces with the one or more networks that carry traffic to and from end points 411. Data center 405 provides a point-of-presence where edge network 402 interfaces with the one or more networks that carry traffic to and from origin servers 421. Edge network 402 may include additional data centers that serve as additional PoPs for interfacing with the same or other networks as data centers 103 and 405.

End points 411, which includes end point 413, end point 115, and end point 417, are representative of computing devices capable of communicating with origin servers 421. Examples include—but are not limited to—laptop and desktop computers, tablet computers, mobile phones, wearable devices, entertainment devices, gaming devices, other server computers, Internet of Things (IoT) devices, or any other type of end point device.

Origin servers 421, which include server 423 and server 425, are representative of the various physical and/or virtual computing devices capable of storing content and providing the content via infrastructure service 401 to end points 411. Examples include, but are not limited to, server computers and data storage devices deployed on-premises, in the cloud, in a hybrid cloud, or elsewhere, by content providers such as enterprises, organizations, individuals, and the like. Examples of content include text, images, video, web pages, objects, applications, transactions, or any other type of content.

End points 411 communicate with infrastructure service 401 and origin servers 421 over transport layer connections that are established to facilitate the exchange of data. The connections may be established in accordance with a variety of communication protocols such as the transmission control protocol (TCP), the stream control transmission protocol (SCTP), and other connection-oriented protocols. Connectionless protocols such as the user datagram protocol (UDP) may also be employed in some implementations.

During operation, when end points 411 attempt to establish a connection with infrastructure service 401 through routes 410, data center 405 first serves end points 411 a digital certificate identifying the particular server within data center 405 that end points 411 is attempting to connect to. Upon receiving the digital certificate from data center 405, end points 411 may create an online certificate status protocol (OCSP) request which includes the serial number, or some other identifier associated with the digital certificate received from data center 405. End points 411 sends the OCSP request to the certificate authority which originally issued the digital certificate, either certificate authority 433, certificate authority 435, or certificate authority 437, over route 150. Route 150 may exist outside of infrastructure service 401 or may pass through all, or part of infrastructure service 401. The certificate authority OCSP responder reads the serial number of the digital certificate identifying the server within data center 405 and determines if the certificate has been revoked. If the certificate is still valid, the certificate authority, either certificate authority 433, certificate authority 435, or certificate authority 437, returns a signed OCSP response to end points 411. Once returned, end points 411 establishes a transport-layer connection with data center 415.

Domain name system (DNS) 418 is a highly simplified representation of a system capable of associating domains names with network addresses. End points 411 communicate with DNS 418 to obtain the network addresses of the various domains the client applications on end points 411 are attempting to reach. Examples includes websites, services, and applications and other such content provided by origin servers 421. Examples of client applications include—but are not limited to: natively installed and executed applications, mobile applications, browser-based applications, streaming applications, and any variation or combination thereof.

DNS 408 is representative of a system within infrastructure service 401 that is also capable of associating domain names with network addresses. DNS 408 may communicate with DNS 418 in some examples to resolve the network address for a domain name. In other examples, DNS 418 may redirect an end point to the network address for DNS 408 so that DNS 408 can resolve the domain name to a network address. Other variations are possible and are considered within the scope of the present disclosure.

In operation, end points 411 submit domain name translation requests to DNS 418 to translate a uniform resource locator (URL) or other such identifier into network addresses with which a given end point can use to obtain connect, engage in secure transactions, or the like. DNS 418 may communicate with DNS 408 in edge network 402 to resolve the domain name request. It is assumed for exemplary purposes that the network addresses routes to a PoP in edge network 402.

End points 411 address packets to the network address provided by DNS 418 and send them via one or more of paths 410 to edge network 402. In an example of content caching, end points 411 send content requests (e.g. HTTP GET messages) to the aforementioned network addresses, which route to PoPs in edge network 402. The requested content may be served from one of the PoPs once the digital certificate of the PoPs is validated by a given certificate authority. On the other hand, if the content has not yet been cached or needs to be refreshed, the content can be obtained from the origin and then served to a given end point.

In such examples, the end points 411 establish transport layer connections with the servers in edge network 402 in order to obtain the requested content. However, in some scenarios the end points 411 establish transport layer connections with servers at the origin, as opposed to (or in addition to) the servers in edge network 402, in order to obtain content directly from the origin, engage in secure transactions or communications, or for other reasons. Infrastructure service 410 may receive a request from end points 411 and recognize it as the first message in a protocol handshake between end points 411 and origin servers 421 and then forwards the request to origin servers 421. Origin servers 421 accepts the request and proceeds to complete the handshake with end pints 411. With the appropriate cryptographic keys in-hand, end points 411 are able to transmit encrypted traffic within the context of the session to origin servers 421, Likewise, origin server 421 is able to transmit encrypted traffic to end points 411.

Upon connecting to an origin server, an end points 411 proceed to setup a secure session with the origin servers 421 in accordance with TLS, SSL, or other security protocols. The end point and the server can then conduct their session securely over route 440 by encrypting and decrypting their communications (encrypted traffic 443 and 445) using the keys exchanged as part of the agreed upon security protocol.

In an advance, infrastructure service 401 employs authentication process 200 described in FIG. 2 that allows the infrastructure service 401 to monitor the OCSP exchange between end points 411 and certificate authorities 431. Authentication process 200 may be implemented in program instructions in the context of any of the software applications, modules, components, or other such programming elements of infrastructure service 401. Additionally, infrastructure service 401 may further incorporate monitoring process 600, described in FIG. 6, to determine the functionality of certificate authorities 431. Monitoring process 600 may be implemented in program instructions in the context of any of the software applications, modules, components, or other such programming elements of infrastructure service 401.

Figure 5:
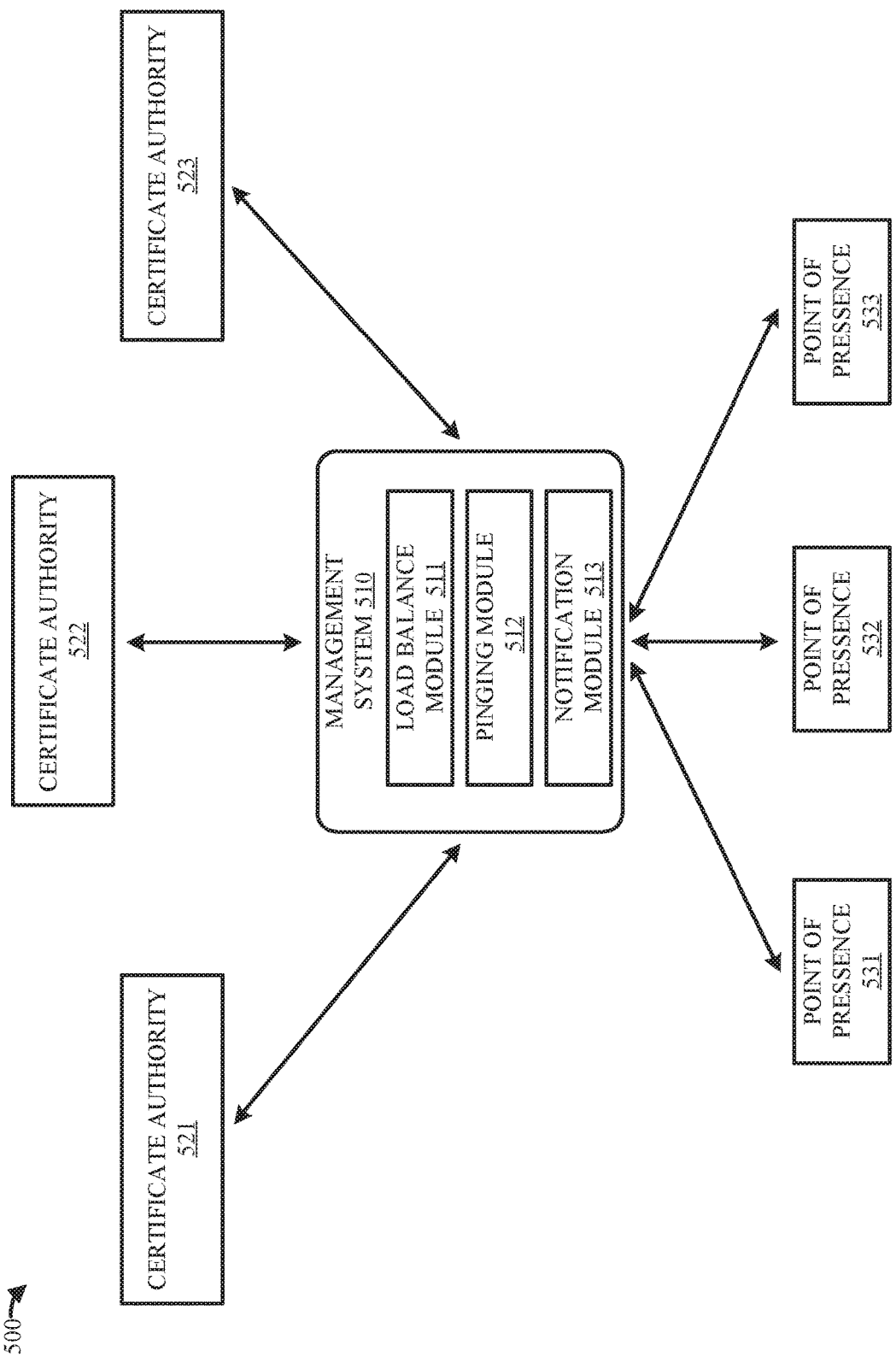
FIG. 5 illustrates a digital certificate load balancing platform in accordance with some embodiments of the present technology.

Referring to FIG. 5 which illustrates an operational architecture 500 in an example implementation of certificate authority load balancing. Management system 510 includes load balance module 511, pinging module 512, and notification module 513. In some implementations, management system 510 exists as a component within an infrastructure service such as a content delivery network. Management system 510 may implement monitoring process 600 as shown in FIG. 600. Computing devices capable of performing the functions of load balance module 511, pinging module 512, and notification module 513 include—server computers, routers, web servers, cloud computing platforms, and data center equipment, as well as any other type of physical or virtual server machine, physical or virtual router, container, and any variation or combination thereof Load balance module 511, pinging module 512, and notification module 513 may exist as a single computing device or may be distributed among a plurality of computing devices.

In some implementations, management system 510 sources digital certificates from certificate authority 521, certificate authority 522, and certificate authority 523. Management system 510, after obtaining digital certificates from each certificate authority, may replicate and then assign point of presence 531, point of presence 532, and point of presence 533 digital certificates obtained from each certificate authority.

Load balancing module 511 oversees the obtaining and distribution of digital certificates from certificate authorities 521, 522, and 523 to points of presence 531, 532, and 533. Load balancing module 511 ensures that each of points of presence 531, 532, and 533 are assigned multiple certificates issued by certificate authorities 521, 522, and 523 to ensure that points of presence 531, 532, and 533 are each multiple certificate holders. Load balancing module 511 may further manage the distribution of digital certificates to user applications. For example, load balancing module 511 may serve certificates to user applications so that certificates issued by each certificate authority are served in approximately equal amounts. Alternatively, load balancing engine 511 may serve certificates in amounts that are proportional to the capacity of each certificate authority to authorize digital certificates. For instance, certificate authority 521 may be able to handle more traffic than certificate authority 522 and so load balancing module 511 would serve more certificates originating from certificate authority 521 than certificate authority 522. Either way, load balancing module prevents any one certificate authority from being inundated with an inordinate amount of certificate authorization requests by either management system 510, points of presence 531, 532, and 533, and/or one or more client applications (not shown).

Pinging module 512 constantly tests the health of certificate authorities 521, 522 and 523 by pinging each certificate authority. This may involve routinely sending Internet control message protocol (ICMP) echo requests, online certificate status protocol (OCSP) health checks, or a hypertext transfer protocol (HTTP) health checks, or any other type of ping or request that identifies the operational state of certificate authorities 521, 522, and 523. When any one of certificate authorities 521, 522, or 523 fails to acknowledge the ping sent by pinging module 512, the operational state of the certificate authority will be considered anomalous. Alternately, pinging module 512 may simply presume that the certificate authority is non-operative. In some embodiments, pinging module 512 may continue to ping non-operative certificate authorities as a means to determine when the anomalous or non-operative certificate authority resumes a normal state or in other words, normal operation.

In an alternative embodiment, management system 510 may be embedded into an infrastructure service (not shown) such as a content delivery network. If any one of certificate authorities 521, 522, or 523 uses the infrastructure service to deliver digital certificates to customers or to validate the digital certificates given to customers, management system 510 may determine if traffic is sent to and from the certificate authority. If management system 510 finds that any of certificate authorities 521, 522, or 523 are failing to send or receive traffic through the network infrastructure provided by the infrastructure service, then management system 510 can prompt notification module 513 that an anomaly exists in any of the certificate authorities or that any of the certificate authorities are down. Once prompted, notification module 513 instructs points of presence 531, 532, and 533 to cease using digital certificates issued by the non-operational certificate authorities.

Notification module 513 communicates with points of presence 531, 532, and 533 to indicate when to stop using certificates associated with a specific certificate authority. For example, if certificate authority 523 fails to respond to a ping sent by pinging module 512, certificate authority 523 will be assumed to be non-functioning and notification module 513 will instruct points of presence 531, 532, and 533 to stop serving client applications certificates that were issued by certificate authority 523. In this example, load balancing module 511 would now only load balance the certificates obtained from certificate authorities 521 and 522 until certificate authority 523 becomes available. In other embodiments, notification module 513 will instruct points of presence 531, 532, and 533 when to resume issuing certificates obtained from a non-operative certificate authority when the non-operative certificate authority resumes normal function.

Figure 6:
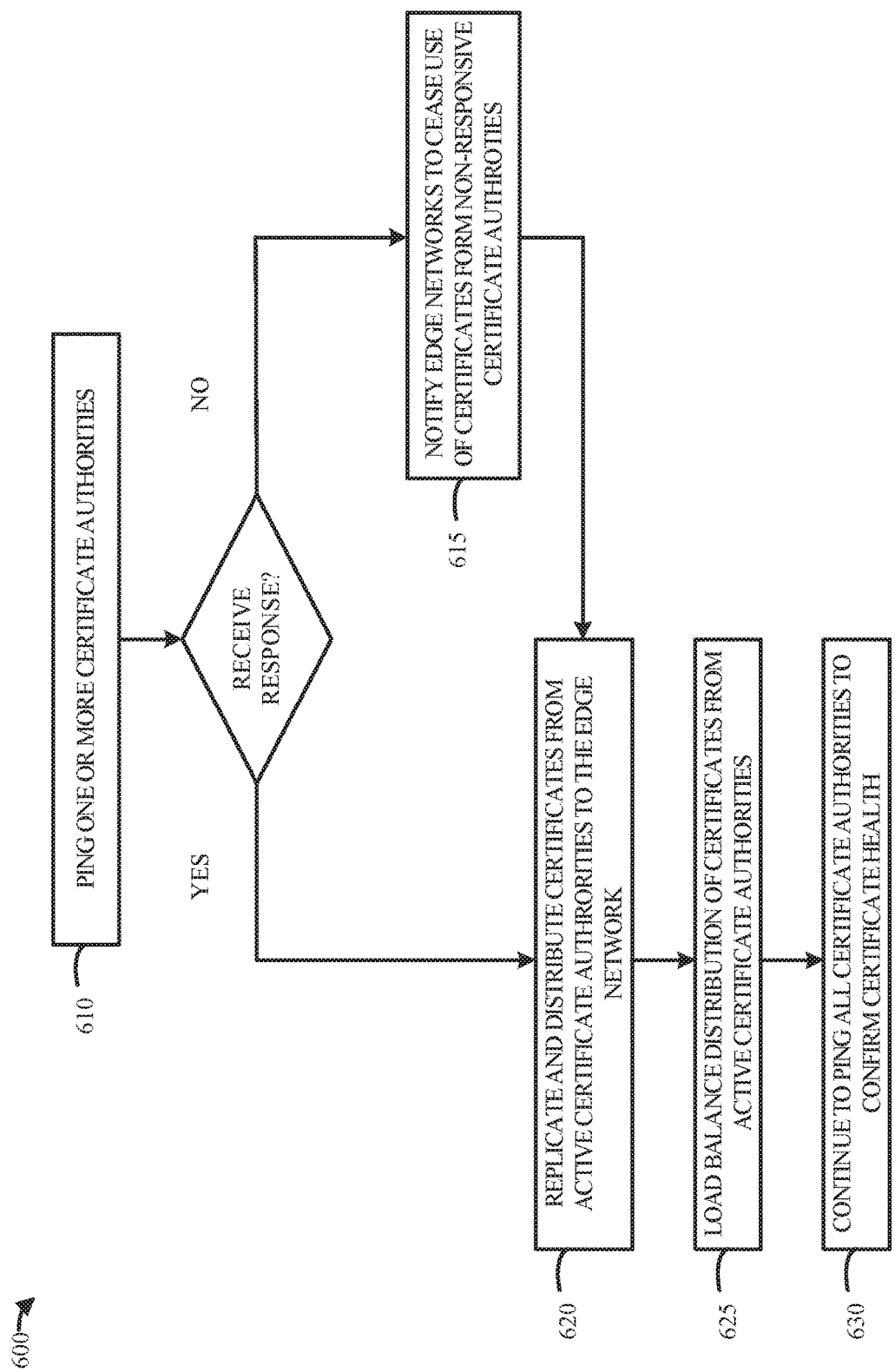
FIG. 6 is a flowchart illustrating a monitoring process in accordance with one or more embodiments of the present technology.

FIG. 6 is flowchart illustrating a set of operations for a monitoring process to monitor certificate authority activity in accordance with one or more embodiments of the present technology. The operations illustrated in FIG. 6 can be performed by a computing system or one or more components (e.g. a processor), engines, and/or modules associated with the computing system. As illustrated in FIG. 6 and referring parenthetically to elements within FIG. 5, a management system or other element within a content delivery network (e.g. pinging module 512) pings one or more certificate authorities to determine the functionality of the one or more certificate authorities (step 610). This may involve sending an internet control message protocol (ICMP) echo request packets, online certificate status protocol (OCSP) health checks, or a hypertext transfer protocol (HTTP) health checks, or any other type of ping or request that identifies the operational state to one or more certificate authorities. Alternatively, the ping may include an OCSP request to sign and time stamp a digital certificate held by the management system. Upon receiving the ping, an active or otherwise functional certificate authority will respond to the ping with a reply that signifies that the operational state of the certificate authority is normal. Alternatively, if the management system does not receive any type of reply to the ping, such as an ICMP echo reply or a signed and time stamped OCSP response, the management system will determine that a state of the certificate authority is anomalous or will determine that the certificate authority is offline. The management system then proceeds to notify the edge network (e.g. point of presence 531) to stop using certificates originating from the anomalous or otherwise offline certificate authority (step 615).

Once notifying the edge network of the status of each certificate authority used by the network, the management system or some other element within the content delivery network replicates and distributes digital certificates throughout the edge network (step 620) and further load balances the distribution of digital certificates to client applications (step 625). Load balancing could include distributing certificates throughout the network such that each element within content delivery network has multiple digital certificates issued by distinct certificate authorities. Load balancing could further include cycling the issuing of digital certificates such that certificates originating from distinct certificate authorities are issued in proportional amounts. For example, point of presence 531 may serve a digital certificate issued by certificate authority 521 to a first user application. Point of presence 531 may then serve a second digital certificate issued by certificate authority 522 to a second user application. It should be appreciated that the number of certificate authorities is not limited nor is the number of digital certificates held by any element of a content delivery network. The management system may then continue to ping the one or more certificate authorities to continue to monitor the health of each certificate authority and determine when offline certificate authorities go back online (step 630). Once back online, the management system can notify the edge network to resume the use of digital certificates originated from the previously non-operational certificate authority.

Figure 7:
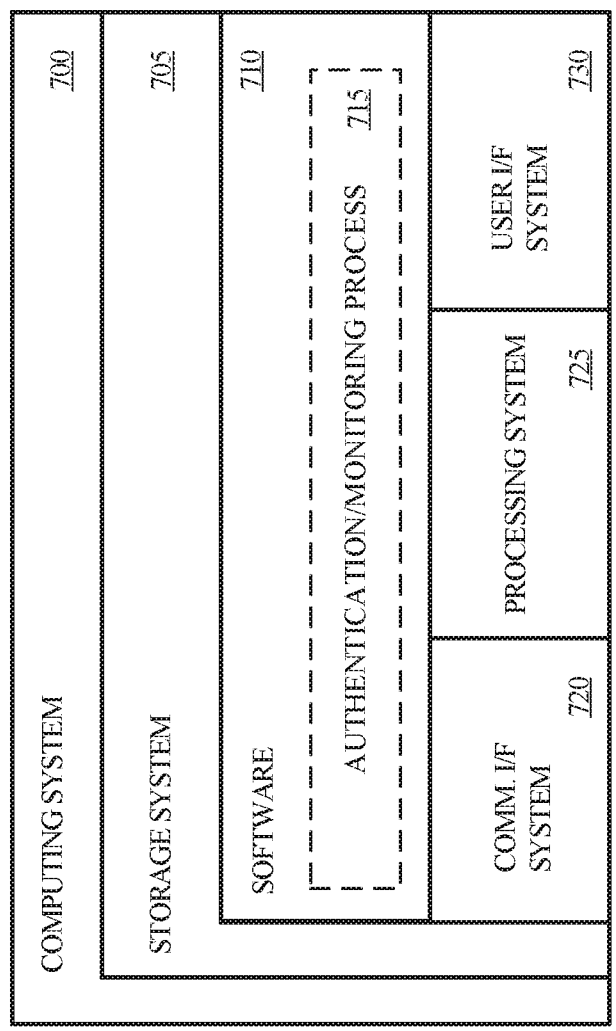
FIG. 7 illustrates an exemplary computing system in accordance with some embodiments of the present technology; and The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

FIG. 7 illustrates computing system 700 that is representative of any system or collection of systems in which the various processes, programs, services, and scenarios disclosed herein may be implemented. Examples of computing system 700 include, but are not limited to, server computers, routers, web servers, cloud computing platforms, and data center equipment, as well as any other type of physical or virtual server machine, physical or virtual router, container, and any variation or combination thereof.

Computing system 700 may be implemented as a single apparatus, system, or device or may be implemented in a distributed manner as multiple apparatuses, systems, or devices. Computing system 700 includes, but is not limited to, processing system 725, storage system 705, software 710, communication interface system 720, and user interface system 730 (optional). Processing system 725 is operatively coupled with storage system 705, communication interface system 720, and user interface system 730.

Processing system 725 loads and executes software 710 from storage system 705. Software 710 includes and implements authentication/monitoring process 715, which is representative of the authentication processes discussed with respect to the preceding Figures. When executed by processing system 725, software 710 directs processing system 725 to operate as described herein for at least the various processes, operational scenarios, and sequences discussed in the foregoing implementations. Computing system 700 may optionally include additional devices, features, or functionality not discussed here for purposes of brevity.

Referring still to FIG. 7, processing system 725 may comprise a micro-processor and other circuitry that retrieves and executes software 710 from storage system 705. Processing system 725 may be implemented within a single processing device but may also be distributed across multiple processing devices or sub-systems that cooperate in executing program instructions. Examples of processing system 725 include general purpose central processing units, graphical processing units, application specific processors, and logic devices, as well as any other type of processing device, combinations, or variations thereof.

Storage system 705 may comprise any computer readable storage media that is readable by processing system 725 and capable of storing software 710. Storage system 705 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 705 may also include computer readable communication media over which at least some of software 710 may be communicated internally or externally. Storage system 705 may be implemented as a single storage device but may also be implemented across multiple storage devices or sub-systems co-located or distributed relative to each other. Storage system 705 may comprise additional elements, such as a controller, capable of communicating with processing system 725 or possibly other systems.

Software 710 (authentication/monitoring process 715) may be implemented in program instructions and among other functions may, when executed by processing system 725, direct processing system 725 to operate as described with respect to the various operational scenarios, sequences, and processes illustrated herein. For example, software 710 may include program instructions for implementing an authentication process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 710 may include additional processes, programs, or components, such as operating system software, virtualization software, or other application software. Software 710 may also comprise firmware or some other form of machine-readable processing instructions executable by processing system 725.

In general, software 710 may, when loaded into processing system 725 and executed, transform a suitable apparatus, system, or device (of which computing system 700 is representative) overall from a general-purpose computing system into a special-purpose computing system customized to optimize secure traffic as described herein. Indeed, encoding software 710 on storage system 705 may transform the physical structure of storage system 705. The specific transformation of the physical structure may depend on various factors in different implementations of this description. Examples of such factors may include but are not limited to, the technology used to implement the storage media of storage system 705 and whether the computer-storage media are characterized as primary or secondary storage, as well as other factors.

For example, if the computer readable storage media are implemented as semiconductor-based memory, software 710 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 720 may include communication connections and devices that allow for communication with other computing systems (not shown) over communication networks (not shown), Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 700 and other computing systems (not shown), may occur over a communication network or networks and in accordance with various communication protocols, combinations of protocols, or variations thereof. Examples include intranets, internees, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method to facilitate server authentication, the method comprising:
   pinging a first certificate authority;
   distributing a first digital authentication certificate corresponding to the first certificate authority and a second digital authentication certificate corresponding to a second certificate authority to an edge node in an edge network for the edge node to provide to client applications;
   determining that an operational state of the first certificate authority is anomalous at least in part due to the first certificate authority failing to acknowledge the pinging; and
   in response to determining that the operational state of the first certificate authorities is anomalous, notifying the edge node in the edge network to stop serving the first digital authentication certificate to the client applications.

2. The method of claim 1 wherein notifying the edge node further comprises directing the edge node to use the second digital authentication certificates when the operational state of the second certificate authority is normal.

3. The method of claim 2 further comprising load balancing distribution of the first and second digital authentication certificates to one or more client applications when the first and second certificate authorities have an operational state that is normal.

4. The method of claim 1 further comprising notifying at least one of the one or more edge nodes that the operational state of the first certificate authority has returned to normal and directing the at least one of the one or more edge nodes to use the first digital authentication certificate.

5. A computing apparatus comprising:
   one or more computer readable storage media;
   one or more processors operatively coupled with the one or more computer-readable storage media; and
   program instructions stored on the one or more computer readable storage media to facilitate server authentication in a content delivery network that, when executed by the one or more processors, direct the computing apparatus to at least:
   receive a request from an end point to establish a secure session;
   send a digital certificate to the end point, wherein the digital certificate is associated with a certificate authority;
   ping one or more certificate authorities wherein the ping comprises one or more of an internet control message protocol (ICMP) echo request, an online certificate status protocol (OCSP) health check, a hypertext transfer protocol (HTTP) health check, or an OCSP request;
   identify which of the one or more certificate authorities respond to the ping and which of the one or more certificate authorities fail to respond to the ping;
   determine that a state of the secure session is anomalous; and
   in response to determining that the state of the secure session is anomalous, send a different digital certificate associated with a different certificate authority to the end point.

6. The computing apparatus of claim 5, wherein the set of instructions further cause the one or more processors to direct one or more elements of the content delivery network to cease the distribution of digital authentication certificates associated with the one or more certificate authorities that failed to respond to the ping.

7. The computing apparatus of claim 6, wherein the set of instructions further cause the one or more processors to load balance the distribution of digital authentication certificates to one or more additional end points when the digital authentication certificates are associated with the one or more certificate authorities that respond to the ping.

8. The computing apparatus of claim 6, wherein the set of instructions further cause the one or more processors to:
   ping the one or more certificate authorities which failed to respond to the ping; and
   notify the one or more elements of the content delivery network when the one or more certificate authorities which failed to respond to the ping, begin to respond to the ping.

9. The method of claim 4 wherein directing the at least one of the one or more edge nodes to use the first digital authentication certificate comprises directing the at least one of the one or more edge nodes to load balance distribution of the first and second digital authentication certificates to one or more client applications.

\* \* \* \* \*